US006513678B2

(12) United States Patent
Yasaka et al.

(10) Patent No.: US 6,513,678 B2
(45) Date of Patent: Feb. 4, 2003

(54) PRODUCT CARRY-OUT APPARATUS FOR VENDING MACHINE

(75) Inventors: Yoshio Yasaka, Gunma-Ken (JP); Hidekazu Yajima, Saitama-Ken (JP); Masaki Nakayama, Saitama-Ken (JP); Satoshi Ishikawa, Saitama-ken (JP); Hiroshi Kobayashi, Saitama-ken (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 104 days.

(21) Appl. No.: 09/821,751

(22) Filed: Mar. 30, 2001

(65) Prior Publication Data

US 2001/0030198 A1 Oct. 18, 2001

(30) Foreign Application Priority Data

Mar. 31, 2000 (JP) ....................................... 2000-096878

(51) Int. Cl.[7] ................................................ B65G 65/02

(52) U.S. Cl. ........................ 221/253; 221/258; 221/123; 221/124; 221/133; 221/236; 312/97

(58) Field of Search ................................ 221/253, 123, 221/124, 133, 236, 258; 312/35, 42, 45, 72, 73, 97

(56) References Cited

U.S. PATENT DOCUMENTS 4,042,098 A * 8/1977 D'Agnolo et al. .......... 198/393
4,955,506 A * 9/1990 Schweiberer ............... 221/213
4,986,441 A * 1/1991 Kanbe et al. ............... 221/130
5,048,719 A * 9/1991 Empl et al. ................. 198/952
5,791,512 A * 8/1998 Kanatsuka .................. 221/130
6,095,369 A * 8/2000 Jenkins et al. .............. 221/253
6,230,932 B1 * 5/2001 Lowing et al. ............. 221/191
6,286,715 B1 * 9/2001 Ziesel et al. ................ 221/171
6,318,591 B1 * 11/2001 Martin ....................... 221/226

FOREIGN PATENT DOCUMENTS

JP 3-18995 * 1/1991 ........... G07F/11/34
JP 11-66749 3/1999

* cited by examiner

*Primary Examiner*—Donald P. Walsh
*Assistant Examiner*—Jonathan R. Miller
(74) *Attorney, Agent, or Firm*—Foley & Lardner

(57) ABSTRACT

Disclosed is a product carry-out apparatus for a vending machine, adapted for carrying a product, which has been delivered downward from a product housing within a vending machine body at the time of selling, in a diagonally upward and forward direction and then carrying out the product to a product take-out port. The apparatus comprises: a conveyor which is rotatable about the rear end between a forward and upward inclined position for selling and a substantially horizontal position for maintenance and, at the time of selling, at the position for selling, receives, on its upper surface, the product delivered from the product housing and carries the product in a diagonally upward and forward direction; and a support for holding the conveyor at the position for selling or at the position for maintenance. By virtue of this construction, the space defined by the product housing and the carrying mechanism can be easily increased according to need while maintaining the number of products housed in the product housing, and, thus, changing the setting of the delivery port of the product housing and the maintenance of the product housing and the carrying mechanism can be easily performed.

6 Claims, 3 Drawing Sheets

1 : VENDING MACHINE
2 : MAIN DOOR
3 : PRODUCT TAKE-OUT PORT
4 : BODY OF VENDING MACHINE
4a : INCLINED PLATE
5 : OUTER DOOR
6 : PRODUCT RECEPTACLE
11 : PRODUCT HOUSING
12 : PRODUCT CARRY-OUT APPARATUS
13 : COOLING/HEATING UNIT
14 : INSULATING DOOR
14a : OPENING
15 : COLUMN
16 : PARATITION PLATE
17 : PRODUCT PASSAGE
17a DELIVERY PORT
18 : OPENING/CLOSING PLATE
21 : CONVEYER UNIT (CARRYING MECHANISM)
22 : SUPPORT
23 : ROTATION SHAFT
24 : CHUTE
27 PRODUCT PUSHING ROD
27A : PRODUCT PUSHING ROD ON CHUTE PLATE
53 : INNER DOOR
54 : SWITCH
S : PRODUCT

1 : VENDING MACHINE
4 : BODY OF VENDING MACHINE
11 : PRODUCT HOUSING
12 : PRODUCT CARRY-OUT APPARATUS
15 : COLUMN
21 : CONVEYER UNIT (CARRY MECHANISM)
22 : SUPPORT
23 : ROTATION SHAFT
24 : CHUTE

FIG.1

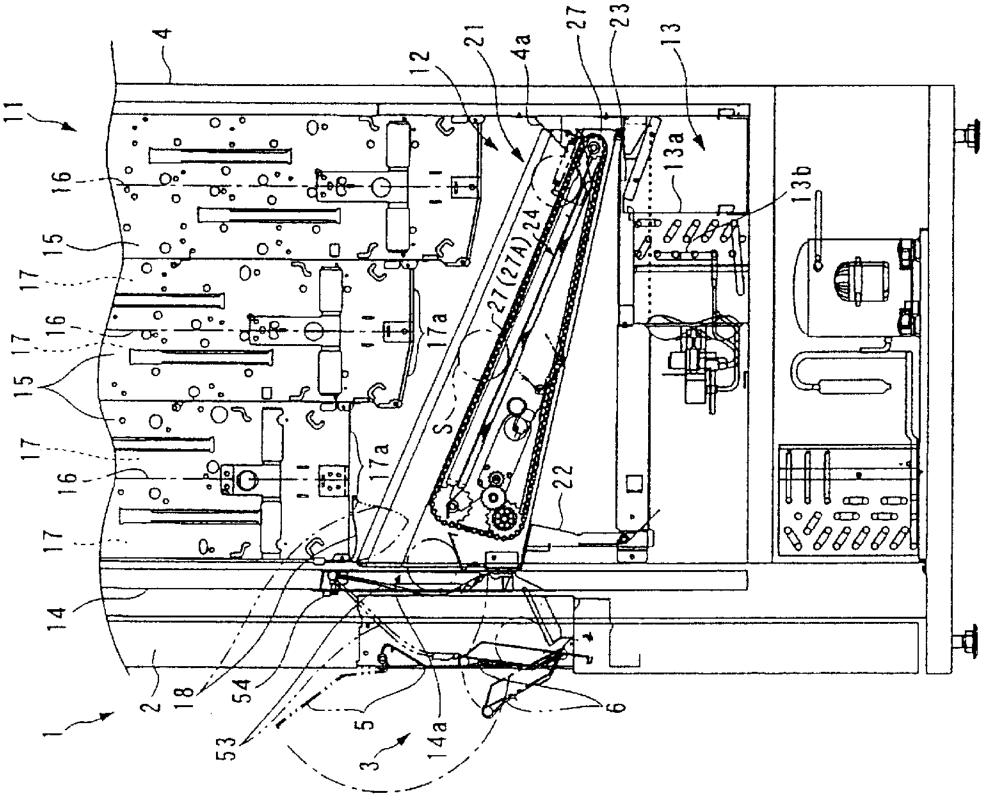

1 : VENDING MACHINE
2 : MAIN DOOR
3 : PRODUCT TAKE-OUT PORT
4 : BODY OF VENDING MACHINE
4a : INCLINED PLATE
5 : OUTER DOOR
6: PRODUCT RECEPTACLE
11: PRODUCT HOUSING
12 : PRODUCT CARRY-OUT APPARATUS
13 : COOLING/HEATING UNIT
14 : INSULATING DOOR
14a : OPENING
15 : COLUMN
16 : PARATITION PLATE
17 : PRODUCT PASSAGE
17a : DELIVERY PORT
18 : OPENING/CLOSING PLATE
21 : CONVEYER UNIT (CARRYING MECHANISM)
22 : SUPPORT
23 : ROTATION SHAFT
24 : CHUTE
27 : PRODUCT PUSHING ROD
27A : PRODUCT PUSHING ROD ON CHUTE PLATE
53 : INNER DOOR
54 : SWITCH
S : PRODUCT

FIG.2

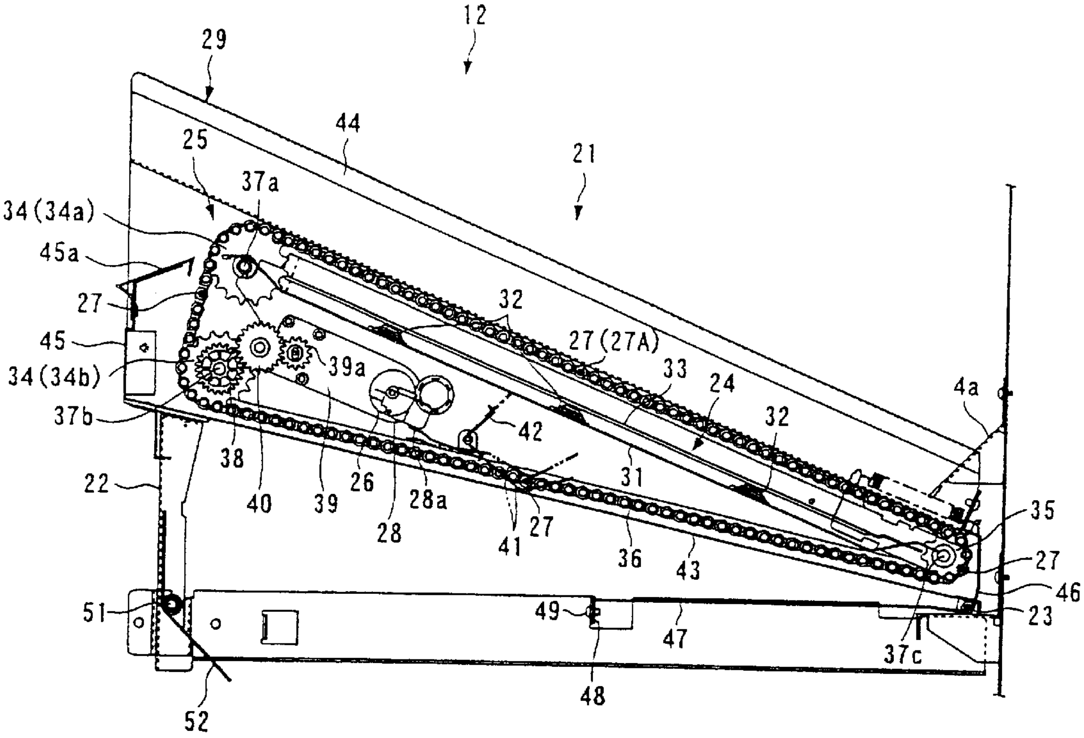

4a : INCLINED PLATE
12 : PRODUCT CARRY-OUT APPARATUS
21 : CONVEYER UNIT (CARRYING MACHINE)
22 : SUPPORT
23 : ROTATION SHAFT
24 : CHUTE
25 : DRIVE MECHANISM
26 : DRIVE MOTOR
27 : PRODUCT PUSHING ROD
27A : PRODUCT PUSHING ROD ON CHUTE PLATE
28 : SWITCH BUTTON
29 : HOUSING CASE
31 : BASE FRAME
32 : COIL SPRING
33 : CHUTE PLATE
34 : FRONT SPROCKET
34a : UPPER SPROCKET
34b : LOWER SPROCKET
36 : CHAIN
37a : CONNECTING SHAFT
37b : CONNECTING SHAFT
37c : CONNECTING SHAFT
38 : DRIVE GEAR
39 : GEAR BOX
39a : GEAR
40 : INTERMEDIATE GEAR
41 : LINK
42 : TORSION COLL SPRING
43 : BOTTOM WALL
44 : SIDE WALL
45 : FRONT WALL
46: REAR WALL
47 : MOUNTING PLATE
48 : MOUNTING MEMBER
49 : MOUNTING SCREW
51 : ROTATION SHAFT
52 : TORSION COIL SPRING

1 : VENDING MACHINE
4 : BODY OF VENDING MACHINE
11 : PRODUCT HOUSING
12 : PRODUCT CARRY-OUT APPARATUS
15 : COLUMN
21 : CONVEYER UNIT (CARRY MECHANISM)
22 : SUPPORT
23 : ROTATION SHAFT
24 : CHUTE

PRODUCT CARRY-OUT APPARATUS FOR VENDING MACHINE

FIELD OF THE INVENTION

The invention relates to a product carry-out apparatus for a vending machine, which, at the time of selling, carries a product, which has been delivered downward from a product housing within a vending machine body, in a diagonally upward and forward direction to carry out the product to a product take-out port provided at a relatively high position.

BACKGROUND OF THE INVENTION

The applicant of the invention has already proposed this type of product carry-out apparatus, for example, in Japanese Patent Application No. 66749/1999. This product carry-out apparatus has a belt conveyor which is provided below a product housing within a vending machine body and, at the time of selling, carries a product, which has been delivered downward from the product housing, to a product take-out port. This belt conveyor is installed in a forward and upward inclined state within the vending machine body. At the time of selling, upon the rotation of the belt in a predetermined direction, the product dropped on the belt is carried in a diagonally upward and forward direction in such a state that the slide-down of the product in the rear direction is prevented by a projection mounted on the belt, followed by carry-out of the product to the product take-out port.

On the other hand, the product housing has a plurality of product passages which are arranged in a longitudinal direction and each are vertically extended. Products of an identical type are housed within each of the product passages in such a state that they have been toppled sideways and vertically stacked on top of one another. Further, each product passage is extended to a position around the belt conveyor from the viewpoints of housing a larger number of products in the product housing and minimizing the impact which the product receives at the time of dropping of the product on the belt. That is, correspondingly to the inclination of the belt conveyor, the downward extending level of the product passage located in the inner part is larger than that of the product passage located in front of the product passage located in the inner part. Further, a product delivery apparatus for delivering only the lowermost located product at the time of selling is provided at the lower end of each of the product passages, and the size of a delivery port in the product delivery apparatus in each product passage can be manually changed according to the size of products.

In the above-described product carry-out apparatus, for example, when the size of the delivery port is changed due to a change in products, for selling, to those having a different size, or when maintenance of the product housing and the belt conveyor is performed, a worker should insert his or her hand into a narrow space defined by the belt conveyor and the product housing. Therefore, the work is troublesome. In particular, for example, the work for changing the size of the delivery port in the product passage located in the inner part and the work for performing maintenance of the product housing in its inner part are very difficult to perform. Further, even though the product housing is constructed so that the product housing can be pulled out toward the worker, the following problem remains unsolved. Specifically, the belt conveyor is fixed within the vending machine body and, in addition, the product passage located in the inner part of the product housing is extended to a position below the upper end of the belt conveyor. Therefore, in pulling out the product housing, the product housing in its portion located in the inner part is blocked by the belt conveyor, and this makes it impossible to pull the product housing, in its portion located in the inner part, before the belt conveyor. For this reason, the maintenance of the product housing in its portion located in the inner part and the belt conveyor in its portion located in the inner part cannot be properly and satisfactorily performed so far as the belt conveyor is not removed.

Further, the conventional product carry-out apparatus has an additional problem that, in changing the item of products for selling, an attempt to deliver at once a plurality of products housed in the product housing before the change of the item in order to take out the products into the outside of the vending machine requires the operation of the belt conveyor, and, thus, requires a lot of time for changing the products for selling. Thus, this product carry-out apparatus has room for improvement in the above point.

SUMMARY OF THE INVENTION

The invention has been made with a view to solving the above problems of the prior art, and it is an object of the invention to provide a product carry-out apparatus for a vending machine, wherein the space defined by the product housing and the carrying mechanism can be easily increased according to need while maintaining the number of products housed in the product housing, and, thus, changing the setting of the delivery port of the product housing and the maintenance of the product housing and the carrying mechanism can be easily performed.

According to the first feature of the invention, a product carry-out apparatus for a vending machine, adapted for carrying a product, delivered downward from a product housing within a vending machine body at the time of selling, in a diagonally upward and forward direction and then carrying out the product to a product take-out port, comprises:

a carrying mechanism which is rotatable about the rear end between a forward and upward inclined position for selling and a substantially horizontal position for maintenance and, at the time of selling, at the position for selling, receives, on its upper surface, the product delivered from the product housing and carries the product in a diagonally upward and forward direction; and holding means for holding the carrying mechanism at the position for selling or at the position for maintenance.

According to this construction, at the time of selling, the product delivered downward from the product housing is dropped and received on the upper surface of the carrying mechanism, is then carried in a diagonally upward and forward direction, and is carried out to the product take-out port. The carrying mechanism, when rotated about the rear end, can be selectively located at the forward and upward inclined position for selling or at the substantially horizontal position for maintenance, and the carrying mechanism is held at one of these two positions by the holding means. Therefore, for example, in changing the setting (size) of a delivery port in the product housing provided with delivery ports which permit the delivery and a change in setting according to the products, or in performing the maintenance of the product housing or the carrying mechanism, prior to this work, the release of the holding of the carrying mechanism at the position for selling by the holding means followed by the rotation of the carrying mechanism to the position for maintenance enables the space defined by the product housing and the carrying mechanism to be easily increased. By virtue of this, changing the setting of the delivery port in the product housing, or maintenance of the product housing and the carrying mechanism can be easily performed while maintaining the number of products housed in the product housing.

In this case, preferably, the holding means has a support which can support from below the front end of the carrying mechanism to hold the carrying mechanism at the position for selling or at the position for maintenance, the height of the support in holding the carrying mechanism at the position for selling being different from the height of the support in holding the carrying mechanism at the position for maintenance, and the support is rotatable between a standing position for holding in a standing posture the carrying mechanism at the position for selling and a toppling position for holding the carrying mechanism at the position for maintenance in a rearward toppled posture.

According to this construction, the carrying mechanism is held at the position for selling by bringing the support to the standing position, and is held at the position for maintenance by bringing the support to the toppling position. In these cases, the support supports from below the front end of the carrying mechanism to hold the carrying mechanism so that the height of the support in holding the carrying mechanism at the position for selling is different from the height of the support in holding the carrying mechanism at the position for maintenance. Therefore, the carrying mechanism can be easily and surely held at the position for selling or at the position for maintenance by rotating the support to the standing position or to the toppling position. Further, when the carrying mechanism located at the position for selling is rotated to the position for maintenance, the carrying mechanism can be easily rotated by slightly toppling backward the support located at the standing position and pushing down the support by the weight of the carrying mechanism.

Further, in this case, preferably, the holding means further comprises energization means for energizing the support toward the standing position.

According to this construction, the support is energized toward the standing position by the energization means. Therefore, when the carrying mechanism located at the position for maintenance is rotated to the position for selling, upon the lift of the front end of the carrying mechanism followed by the rotation of the carrying mechanism to a position slightly above the position for selling, the pushing-down by the carrying mechanism is released, and the support located at the toppling position is automatically rotated to the standing position. Thereafter, upon the removal of the hand from the carrying mechanism, the carrying mechanism is supported from below by the support, and is held at the position for selling. Thus, the carrying mechanism located at the position for maintenance can be easily rotated to the position for selling by merely lifting once the front end of the carrying mechanism, located at the position for maintenance, to a predetermined height (to a height slightly above the position for selling).

In these cases, preferably, the carrying mechanism is detachably mounted within the vending machine body.

According to this construction, the carrying mechanism can be removed from within the vending machine body. The removal of the carrying mechanism from the vending machine body renders the maintenance work easier. Further, the removal of the carrying mechanism from the vending machine body can ensure a wider space below the product housing within the vending machine body. This makes it easier to change the setting of the delivery port and to perform maintenance of the product housing.

BRIEF DESCRIPTION OF THE DRAWINGS

The invention will be explained in more detail in conjunction with the appended drawings, wherein:

FIG. 1 is a sectional side view showing the interior of a vending machine incorporating a product carry-out apparatus according to a preferred embodiment of the invention;

FIG. 2 is an enlarged sectional side view of a product carry-out apparatus.

DESCRIPTION OF THE PREFERRED EMBODIMENTS

Figure 3:
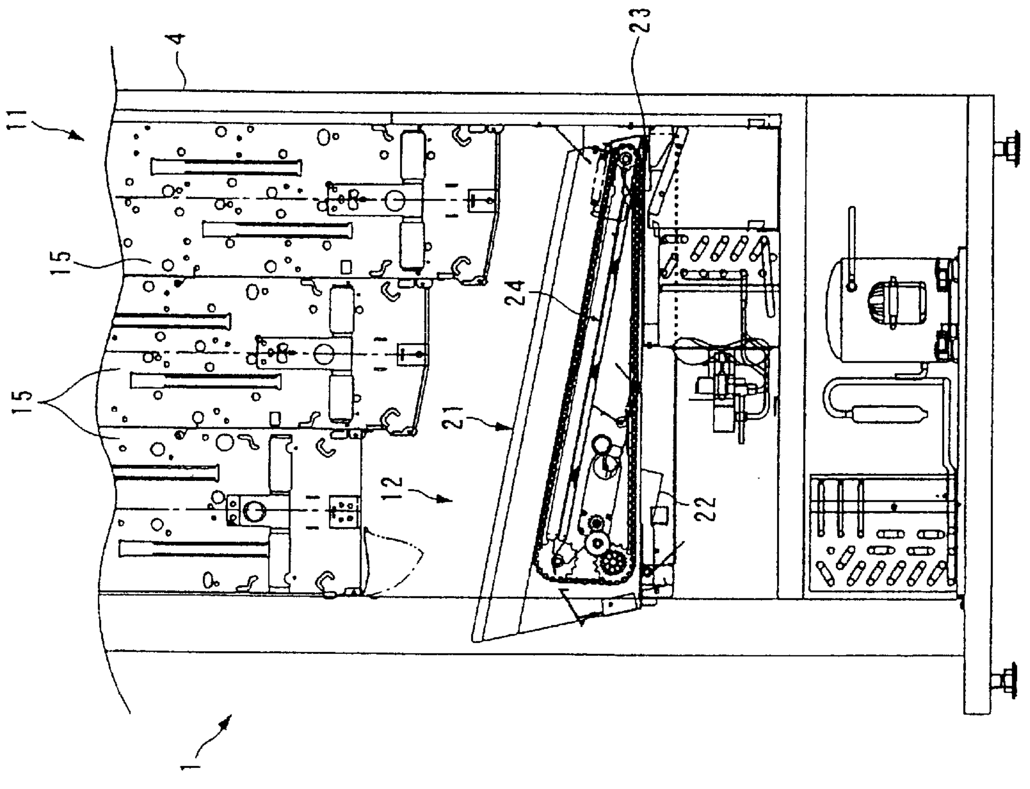
FIG. 3 is a sectional side view of a product carry-out apparatus which has been held in the position of maintenance.

Preferred embodiments of the invention will be explained in more detail in conjunction with the accompanying drawings. FIG. 1 shows the interior of a vending machine incorporating a product carry-out apparatus according to a preferred embodiment of the invention. As shown in the drawing, this vending machine 1 is of the so-called "barrier-free type," wherein a product take-out port 3 in a main door 2 is provided at a relatively higher position than conventional vending machines and a purchaser can take out a product without the necessity of significant stooping. The vending machine 1 comprises the main door 2 and a box-type vending machine body 4 the front of which can be opened and closed by the main door 2.

The main door 2 has, at its front, for example, a selection button for selecting a product and a money slot for putting a money into the vending machine (both not shown). Further, a control circuit (not shown), provided with a microcomputer, for performing various types of control within the vending machine body 4 including a product carry-out apparatus 12 described below is provided at the back of the main door 2. The product take-out port 3 comprises an outer door 5 for opening and closing its front and a product receptacle 6 for receiving a product S which has been carried out to the product take-out port 3. The outer door 5 is rotatable about the upper end. The outer door 5 is in a suspended state in a usual state to close the product take-out port 3, and, when a purchaser lifts the lower end of the outer door 5 at the time of the takeout of the product S, opens the product take-out port 3. On the other hand, the front wall of a product receptacle 6 is rotatable about the lower end. In a usual state, the front wall stands up on the backside of the outer door 5 and receives the carried-out product S. At the time of taking out the product S, when the purchaser pulls the upper end toward him or her, the front wall is slightly inclined toward the purchaser so that the purchaser can easily take out the product S.

The vending machine body 4 has, in its interior, for example, a product housing 11 for housing a product S, a product carry-out apparatus 12 for carrying out, at the time of selling, the product S delivered downward from the product housing 11 to the product take-out port 3 and a cooling/heating unit 13 for cooling or heating the product S within the product housing 11. An openable insulating door 14 is provided at the front. The interior of the vending machine body 4 is partitioned in a lateral direction (front and back direction in FIG. 1) by a plurality of insulating walls (not shown), and the product housing 11 and the product carry-out apparatus 12 are disposed between the insulating walls which face each other. Further, for example, an evaporator 13*a* or a heater 13*b* for the cooling/heating unit 13 is disposed.

The product housing 11 is constituted by three vertically extended columns 15 connected to one another in the longitudinal direction (lateral direction in FIG. 1). The four longitudinal and lateral sides of each column are formed of an oblong metal plate. Within each of the columns 15, two vertically extended front and rear product passages 17, 17 are provided by partitioning, for example, by a partition plate 16 in the longitudinal direction. Products S of an identical type, such as various canned beverage products and PET bottled products, are housed in each of the product passages 17 in such a state that they have been toppled sideways and vertically stacked on top of one another. Further, in each of the columns 15, a product delivery apparatus (not shown), which delivers only the lowermost located product S downward at the time of selling, is provided at the lower end for each of the product passages 17. The setting of a delivery port 17*a* located at the lower end of the product passage 17 and regulated by each product delivery apparatus can be manually changed according to the size of the product S. Further, the downward extending level of the columns 15 corresponds to the inclination of the conveyor 21 in the product carry-out apparatus 12 described below. Specifically, the closer to the rear end, the larger the downward extending level of the column 15. Thus, the drop distance of the product S delivered from each column 15 to the product carry-out apparatus 12 is minimized. This can reduce an impact, which the product S receives at the time of dropping, and, in addition, enables a larger number of products S to be housed in the product housing 11.

In the product housing 11 having the above construction, at the time of selling, only the lowermost located product S is delivered from the product passage 17 housing products selected by a purchaser, and is dropped on a chute 24 in the product carry-out apparatus 12 described below. The forefront column 15 is provided with an opening/closing plate 18 for opening and closing the delivery port 17*a* of the product passage 17 on the front side thereof. At the time of selling, the product S delivered from the delivery port 17*a* is guided by the opening/closing plate 18, which has opened the delivery port 17*a* in a forward and downward inclined state, and is carried out to the product take-out port 3 without the operation of the product carry-out apparatus 12. The product S delivered from the rear product passage 17 within the inmost column 15 is dropped on a forward and downward inclined plate 4*a*, which is located below the product passage 17 and mounted on the backside within the vending machine body 4, then slides down forward, and is received on the chute 24.

The product carry-out apparatus 12 is disposed below the product housing 11, and, at the time of selling, receives the product S delivered and dropped from the product housing 11, then carries the product S in a diagonally upward and forward direction, and carries out the product S to the product take-out port 3. This product carry-out apparatus 12 comprises a conveyor 21 (carrying mechanism) for carrying the product S at the time of selling, and a support 22 (holding means) for holding the conveyor 21 at a predetermined position (a position for selling or a position for maintenance described below).

The conveyor 21 is rotatable, about a rotating shaft 23 located at the bottom of the rear end, between the forward and upward inclined position for selling (see FIGS. 1 and 2) and the wholly substantially horizontal position for maintenance (see FIG. 3). In a usual state, the conveyor 21 is held by the support 22 at the position for selling, while, for example, at the time of maintenance of the interior of the vending machine body 4, the conveyor 21 is held at the position for maintenance. As shown in FIG. 2, the conveyor 21 comprises: a chute 24 which is inclined in a forward and upward direction and receives, on its upper surface, the delivered product S; a pair of left and right drive mechanisms 25 (only one of the pair of drive mechanisms is shown) disposed respectively on left and right both ends of the chute 24; a drive motor 26 (a drive source) for driving these drive mechanisms 25; a plurality of product pushing rods 27 which are mounted between chains 36, described below, in both the drive mechanisms 25; a stop control switch 28 for controlling the stop of the drive motor 26 through switching between ON/OFF by the product pushing rod 27; and the like. The chute 24 and the like are housed within a housing case 29 having a predetermined shape.

The chute 24 has a base frame 31 which is inclined in a forward and upward direction and is substantially rectangular in its plane shape. A chute plate 33, which is rectangular in its plane shape, is mounted through a plurality of conical coil springs 32 (cushioning members) on the base frame 31. Therefore, at the time of selling, the product S delivered from the product housing 11 is dropped on the chute plate 33. An impact, which the product S receives from the chute plate 33 upon dropping of the product S, can be relaxed by the coil spring 32. This can prevent the deformation of the product S, and, in addition, can suppress foaming in the case where the product S is a carbonated beverage. Further, in the base frame 31 and the chute plate 33, a large number of through holes (not shown) are provided so as to be vertically passed through the base frame 31 and the chute plate 33. Chill air and warm air from the cooling/heating unit 13 are vertically circulated in the product carry-out apparatus 12 via through holes to cool or warm the product S within the product housing 11.

Each of the drive mechanisms 25 comprises: two front sprockets 34 which are rotatably provided at the front end of the chute 24 while vertically leaving a space (hereinafter, the front sprocket provided on the upper side is often referred to as "upper sprocket 34*a*," and the front sprocket provided on the lower side is often referred to as "lower sprocket 34*b*"); a rear sprocket 35 which is rotatably provided at the rear end of the chute 24; and chains 36 which are put and wound on the front sprocket 34 and the rear sprocket 35. In both the drive mechanisms 25, the upper sprockets 34*a* are connected to each other through a laterally extended connecting shaft 37*a* and are synchronously rotated. Likewise, the lower sprockets 34*b* are connected to each other through a laterally extended connecting shaft 37*b* and are synchronously rotated, and the rear sprockets 35 are connected to each other through a laterally extended connecting shaft 37*c* and are synchronously rotated. A drive gear 38 constituted by a spur gear is fixed along the connecting shaft 37*b* which connects the lower sprockets 34*b* to each other. This drive gear 38 is rotatively driven in a predetermined direction by a drive motor 26. This drive gear 38 may be constructed integrally with the lower sprocket 34*b*.

The drive motor 26 is disposed below the chute 24, and is connected to the drive gear 38 through a plurality of gears 39 *a* (only one of the gears 39 *a* is shown) and an intermediate gear 40 within a gear box 39. By virtue of this construction, at the time of selling, upon the operation of the drive motor 26, the drive gear 38 is rotatively driven anti-clockwise, and this permits the lower sprockets 34*b* respectively in both the drive mechanisms 25 to be rotated anti-clockwise. Thus, upon the rotation of both the lower sprockets 34*b*, the chains 36 respectively in both the drive mechanisms 25 are rotated anti-clockwise through the utilization of both the lower sprockets 34*b* as sprockets for motive power.

Four product pushing rods 27 are mounted, over a portion between the chains 36 respectively in both the drive mechanisms 25, at equal intervals in the circumferential direction of the chains 36. Therefore, as described above, at the time of selling, upon the rotation of the chains 36 respectively in both the drive mechanisms 25 in an anti-clockwise direction, the product pushing rods 27 are moved in the circumference of the chute 24 in an anti-clockwise direction.

The stop control switch 28 is provided around the drive motor 26, and is switched between ON and OFF by the product pushing rod 27 through a rotatable link 41 having a predetermined shape. Specifically, in a usual state, the link 41 is positioned in a state energized by a torsion coil spring 42 toward a predetermined position indicated by a solid line in FIG. 2. This presses a switch button 28*a* in the stop control switch 28 and thus permits the stop control switch 28 to be brought to an ON or OFF state. On the other hand, when one of the product pushing rods 27 is passed below the link 41, the link 41 is rotatively driven, while defying the torsion coil spring 42, to a switching position indicted by a chain double-dashed line in FIG. 2. This releases the pushing of the switch button 28*a* by the link 41, and thus brings the stop control switch 28 to an OFF or ON state.

When predetermined stop conditions, described below, for stopping the drive motor 26 are established and, as described above, the stop control switch 28 is subjected to ON/OFF swtiching by the product pushing rod 27 through the link 41, a control signal is sent from a control circuit (not shown) to the drive motor 26, and, based on this, the drive motor 26 is stopped. Further, this stops the rotation of the chains 36 respectively in both the drive mechanisms 25, and thus stops the product pushing rods 27 at respective predetermined positions (standby positions). More specifically, as shown in FIG. 2, four product pushing rods 27 are stopped respectively at a position above an intermediate portion in the longitudinal direction of the chute plate 33, a position between the upper sprocket 34*a* and the lower sprocket 34*b*, a position below the link 41, and a position around the rear sprocket 35. In particular, as shown in FIG. 1, the product pushing rod 27, which stops at a position above the chute plate 33, is stopped so as to locate-just under a portion between front and rear two delivery ports 17*a*, 17*a* in a central column 15. This permits all products S delivered from the delivery port 17*a* to be surely dropped on the chute plate 33 without hitting against the product pushing rods 27.

That is, for example, when the product pushing rod 27 is located just under any one of the delivery ports 17*a*, the product delivered from this delivery port 17*a* is once hit against the product pushing rod 27, and is then dropped on the chute plate 33. In this case, the level of impact, which the product S receives, is high. By contrast, as described above, when the product pushing rod 27 above the chute plate 33 is located just under the portion between the delivery ports 17*a*, 17*a* in the central column 15, the level of impact, which the product S receives, can be reduced. As a result, the deformation and foaming of the product S can be prevented on a higher level. The product S delivered from the delivery port 17*a* located in front of the product pushing rod 27 is dropped on the chute plate 33, then slightly slides down backward, and is abutted against and surely supported by the product pushing rod 27.

The housing case 29 for housing the chute 24 and the like comprises a bottom wall 43, a pair of left and right side walls 44 (only one of the side walls is shown), a front wall 45, and a rear wall 46, and the upper part and the upper half part of the front of the housing case 29 is opened. A carry-out chute 45*a*, which is inclined in a rear and upward direction and is extended to a portion near the front end of the chute 24, is provided at the upper part of the front wall 45. This carry out chute 45*a* receives the product S carried to the front end of the chute 24, then allows the product S to slide down forward, and is carried out to the product take-out port 3.

A mounting plate 47, which has a rear end rotatably connected to the rotating shaft 23 and is extended in a longitudinal direction, is provided below a bottom wall 43 of the housing case 29. This mounting plate 47 has a downward bent front end, and is screwed only from the front by a mounting screw 49 to a mounting member 48 within the vending machine body 4. That is, the conveyor 21 can be mounted within the vending machine body 4 by mounting the mounting plate 47 to the mounting member 48 by the mounting screw 49, and can be removed from within the vending machine body 4 by removing the mounting screw 49.

As described above, the conveyor 21 having the above construction is held by the support 22 at the position for selling or the position for maintenance. This support 22 is constructed by bending both the left and right ends and the upper end of the metal plate, and is rotatable about the rotating shaft 51 inserted into the lower end between a standing position, that is, a standing posture (see FIGS. 1 and 2), and a toppled position, that is, a posture substantially horizontally toppled toward the rear side (see FIG. 3). Further, a torsion coil spring 52 (energization means), which energizes the support 22 against the standing position, is mounted on the rotating shaft 51.

An opening 14*a*, which permits the passage of the product S, is provided in an insulating door 14 at its portion which faces the front of the conveyor 21 located at the selling position. An insulating inner door 53, which is rotatable about the upper end, is provided on the opening 14*a*. In a usual state, this inner door 53 is in a suspended state to close the opening 14*a*. On the other hand, at the time of selling, the inner door 53 is pushed and opened by the weight of the product S which has been received by the carry-out chute 45*a* and slides down forward along the carry-out chute 45*a*, thereby opening the opening 14*a*. An inner door opening/closing discrimination switch 54 for determining whether the inner door 53 is opened or closed, is provided at the upper end of the inner door 53. This switch 54 determines whether the closed inner door 53 has been opened, or the once opened inner door 53 has been closed.

Next, the operation of the product carry-out apparatus 12 at the time of selling will be explained. As described above, in a usual state, the conveyor 21 in the product carry-out apparatus 12 is held at the position for selling, and the product pushing rods 27 are located respectively at standby positions shown in FIG. 2. As soon as a purchaser puts a money into the slot and depresses a selection button for a desired product, the product delivery apparatus in the product passage 17 housing this product is operated to deliver only the lowermost located product S.

When the product S has been delivered from the forefront product passage 17, the product S is dropped on the carry-out chute 45*a* while being guided by the opening/closing plate 13, and then slides down forward along the carry-out chute 45*a*. The product S pushes and opens by its own weight the inner door 53 and is carried out to the product take-out port 3. Therefore, in this case, the product S is carried out to the product take-out port 3 without the operation of the conveyor 21 to complete the selling of the product.

Further, except for the forefront product passage 17, when the product S has been delivered from the product passage 17 located at a position in front of the product pushing rod 27 on the chute plate 33 (this product pushing rod is hereinafter referred to as "product pushing rod 27A"), the product S is dropped on the chute plate 33, then slightly slides down backward, and, on the rear side, is abutted against and supported by the product pushing rod 27A. Thereafter, upon the operation of the drive motor 26 to rotate the chains 36 respectively in both the drive mechanisms 25 in an anti-clockwise direction, all the product pushing rods 27 are moved, and the product pushing rod 27A is moved forward along the chute plate 33. This permits the product S supported by the product pushing rod 27A to be pushed from behind by the product pushing rod 27A, whereby the product S is carried in a diagonally upward and forward direction along the chute plate 33 and is received by the carry-out chute 45*a*. Thereafter, as with the case described above, the product S pushes and opens the inner door 53, and is carried out to the product take-out port 3 to complete the selling of the product.

In this case, the inner door opening/closing discrimination switch 54 confirms the opening of the inner door 53, and, when the stop control switch 28 has repeated ON/OFF switching by a predetermined number of times (for example, twice), a control signal is sent from the control circuit to the drive motor 26 to stop the drive motor 26 based on this. This permits the product pushing rods 27 to be stopped respectively at standby positions for next selling.

When the product S has been delivered from the product passage 17 located behind the product pushing rod 27A, the product S is dropped on the chute plate 33, then slides down backward toward the rear end of the chute plate 33, and, on the rear side, is abutted against and supported by the inclined plate 4*a* within the vending machine body 4. When the product s has been delivered from the inmost product passage 17, the product S is once dropped on the inclined plate 4*a*, then slides down forward, and is received by the chute plate 33.

Thereafter, upon the operation of the drive motor 26, all the product pushing rods 27 are moved, and the product pushing rod 27 located around the rear sprocket 35 pushes from behind the product S to move the product S in a diagonally upward and forward direction along the chute plate 33. This permits the product S to be carried in a diagonally upward and forward direction along the chute plate 33, and, as with the case described above, the product S is received by the carry-out chute 45*a*, then pushes and opens the inner door 53, and is carried out to the product take-out port 3 to complete the selling of the product. Also in this case, as with the case described above, when the inner door 53 has been opened and the stop control switch 28 has been subjected to ON/OFF switching by a predetermined number of times, the drive motor 26 is stopped, whereby the product pushing rods 27 stop respectively at standby positions for next selling.

Next, the handling of the product carry-out apparatus 12 at the time of maintenance within the vending machine body 4 will be explained. At the time of maintenance, the main door 2 to and the insulating door 14 are first opened. Subsequently, as shown in FIG. 3, the support 22 at the standing position is rotated to the toppled position. In this case, while supporting by the hand the front end of the conveyor 21 located at the position for selling, the upper end of the support 22 at the standing position is slightly pushed backward while defying the torsion coil spring 52. When the support 22 has been slightly inclined backward, the force level of the hand, which supports the conveyor 21, is lowered to rotate the conveyor 21 to the position for maintenance. Upon the rotation of the conveyor 21, the support 22, which has been slightly inclined backward, is rotated toward the toppling position by the weight of the conveyor 21.

Thus, the rotation of the conveyor 21 at the position for selling to the position for maintenance can ensure a large space between the product housing 11 and the conveyor 21. By virtue of this construction, for example, in changing the setting of the delivery port 17*a* in the product passage 17, in particular, even when the contemplated delivery port 17*a* is located on the inner part within the vending machine body 4, the arm can be stretched to the inner part to easily change the setting.

Further, the maintenance of the product housing 11 and the conveyor 21 can be performed by a method wherein the conveyor 21 is held at the position for maintenance, or by a method wherein the mounting screw 49 is removed from the mounting plate 47, and the conveyor 21 per se is completely removed from the vending machine body 4 by pulling out the conveyor 21 forward while using the support 22 at the toppling position as a guide. When the maintenance is performed in such a state that the conveyor 21 has been removed from the vending machine body 4, after the completion of the maintenance, the conveyor 21 is mounted within the vending machine body 4 according to the procedure which is opposite to the procedure described above.

Thereafter, the front end of the conveyor 21 located at the position for maintenance is lifted, and the conveyor 21 is rotated to a position slightly beyond the position for selling. As a result, the support 22 located at the toppling position is automatically returned by the torsion coil spring 52 to the standing position. Upon the removal of the hand which has lifted the conveyor 21, the conveyor 21 is held at the position for selling in such a state that the conveyor 21 is supported from below by the support 22.

As is apparent from the foregoing detailed description, in the product carry-out apparatus 12 according to this preferred embodiment, the conveyor 21 can be selectively located at the forward and upward inclined position for selling or at the substantially horizontal position for maintenance. Therefore, in changing the setting (size) of a delivery port 17*a* in the product passage 17, or in performing the maintenance of the product housing 11 or the conveyor 21, prior to this work, the release of the holding of the conveyor 21 at the position for selling by the support 22 followed by the rotation of the conveyor 21 to the position for maintenance enables the space defined by the product housing 11 and the conveyor 21 to be easily increased. By virtue of this, changing the setting of the delivery port 17*a* in the product housing 11, or maintenance of the product housing 11 and the conveyor 21 can be easily performed while maintaining the number of products housed in the product housing 11.

It should be noted that the invention is not limited to the above preferred embodiments and may be practiced according to other embodiments. For example, a belt type or other type conveyor may be used instead of the conveyer 21 in the above preferred embodiment. Further, it should be noted that the detailed construction of the product carry-out apparatus 12 and the like described in the preferred embodiments are illustrative only, and can be properly modified within the scope of the invention.

Thus, the product carry-out apparatus for a vending machine according to the invention is advantageous, for example, in that the space defined by the product housing and the carrying mechanism can be easily increased according to need while maintaining the number of products housed in the product housing, and, thus, changing the setting of the delivery port of the product housing and the maintenance of the product housing and the carrying mechanism can be easily performed.

The invention has been described in detail with particular reference to preferred embodiments, but it will be understood that variations and modifications can be effected within the scope of the invention as set forth in the appended claims.

What is claimed is:

1. A product carry-out apparatus for a vending machine, adapted for carrying a product, which has been delivered downward from a product housing within a vending machine body at the time of selling, in a diagonally upward and forward direction and then carrying out the product to a product takeout port, said product carry-out apparatus comprising:

a carrying mechanism which is rotatable about the rear end between a forward and upward inclined position for selling and a substantially horizontal position for maintenance and, at the time of selling, at the position for selling, receives, on its upper surface, the product delivered from the product housing and carries the product in a diagonally upward and forward direction; and holding means for holding the carrying mechanism at the position for selling or at the position for maintenance.

2. The product carry-out apparatus for a vending machine according to claim 1, wherein the holding means has a support which can support from below the front end of the carrying mechanism to hold the carrying mechanism at the position for selling or at the position for maintenance, the height of the support in holding the carrying mechanism at the position for selling being different from the height of the support in holding the carrying mechanism at the position for maintenance, and the support is rotatable between a standing position for holding in a standing posture the carrying mechanism at the position for selling and a toppling position for holding the carrying mechanism at the position for maintenance in a rearward toppled posture.

3. The product carry-out apparatus for a vending machine according to claim 2, wherein the holding means further comprises energization means for energizing the support toward the standing position.

4. The product carry-out apparatus for a vending machine according to claim 3, wherein the carrying mechanism is detachably mounted within the vending machine body.

5. The product carry-out apparatus for a vending machine according to claim 2, wherein the carrying mechanism is detachably mounted within the vending machine body.

6. The product carry-out apparatus for a vending machine according to claim 1, wherein the carrying mechanism is detachably mounted within the vending machine body.

* * * * *